(12) United States Patent
Hook et al.

(10) Patent No.: US 6,305,731 B1
(45) Date of Patent: *Oct. 23, 2001

(54) LINER FOR A WORK MACHINE BODY AND METHOD FOR MANUFACTURING THE SAME

(75) Inventors: Layne E. Hook, Monticello; Theodore A. Moutrey, Taylorville; James W. Thais, White Heath; William L. Burg, Decatur, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/675,508

(22) Filed: Sep. 29, 2000

Related U.S. Application Data

(63) Continuation of application No. 09/335,354, filed on Jun. 17, 1999, now Pat. No. 6,174,014.

(51) Int. Cl.[7] .................................................. B62D 33/00
(52) U.S. Cl. .......................................... 296/39.2; 296/184
(58) Field of Search ................................. 296/39.2, 39.1, 296/184, 41

(56) References Cited

U.S. PATENT DOCUMENTS

| | | | |
|---|---|---|---|
| 4,091,149 | * 5/1978 | Oxendine | 296/39.2 X |
| 5,851,043 | * 12/1998 | Moutrey et al. | 296/39.2 |
| 6,000,741 | * 12/1999 | Reynolds et al. | 296/39.2 |
| 6,007,132 | * 12/1999 | Burg et al. | 296/39.2 |
| 6,129,409 | * 10/2000 | D'Amico | 296/184 |
| 6,174,014 | * 1/2001 | Hook et al. | 296/39.2 |

* cited by examiner

*Primary Examiner*—Joseph D. Pape
*Assistant Examiner*—Patricia Engle
(74) *Attorney, Agent, or Firm*—Thomas L. Derry

(57) ABSTRACT

A liner for a high-wear portion of a work machine body, such as a dump truck body, is formed by separating a unitary plate of wear material, such as steel, into separate plate sections. The plate sections are formed such that confronting plate sections have portions that interfit with each other. Gaps or voids are left between the interfitting portions to define openings the liner from the top surface to the bottom surface thereof. The openings cause material ejected across the liner to tumble rather than slide, thereby reducing abrasive wear. By separating the plate and forming the liner in this manner, no scrap material is created, which reduces cost compared to known design. In addition, liners having a variety of different dimensions can be created from the same plate sections by varying the relative spacing between adjacent plate sections.

11 Claims, 5 Drawing Sheets

LINER FOR A WORK MACHINE BODY AND METHOD FOR MANUFACTURING THE SAME

CROSS REFRENCE TO RELATED APPLICATION

This application is a continuation and claim the benefit under 35 U.S.C. §120 of prior application No. 09/335,354, filed on Jun. 17, 1999 now U.S. Pat. No. 6,174,014.

TECHNICAL FIELD

This invention relates to liners for protecting material carrying bodies from wear, such as occurs in truck beds. More particularly, the invention relates to liners that cause material to tumble instead of to slide when dumping from a truck body and a method for manufacturing the same.

BACKGROUND ART

Work machines that carry material are subject to wear through the movement of material in the body of the machine. For example, an off-highway truck typically has a material-carrying body that can be moved to an upright position to eject the material through an opening in the body. This wear is particularly aggravated, for example, by the sliding of material across the portion of the bed or floor adjacent the rear opening from which the material is ejected. Other trucks for hauling and dumping may have similar problems with wear.

In an attempt reduce wear, many solutions have been tried. For example, sheets of material as liners are sometimes added to a truck body to provide additional protection. However, such liners are still subject to the same high wear of sliding materials as the truck bodies they protect since they have a substantially smooth upper surface, which permits the materials to slide from the body. Another solution has been to attach bars to the bed or floor of a truck body in rows across the width of the bed. Similarly, a cross hatch of plates approximately two inches high have been added to provide "boxes" on the bed of the truck. The bars or boxes cause material to tumble instead of slide as it moves across the truck bed be ejected from the rear opening. This tumbling motion reduces wear by tending to reduce the high abrasion of sliding material. However, these so-called tumbler bars or boxes require a considerable amount of welding to attach, involve the handling of a large number of different parts, are limited in the way they can be attached (typically only by conventional welding) and are susceptible to breaking loose. If they do break loose, the metal parts can be ejected from the truck body into another material handling device, such as a rock crusher, and cause damage to that device.

One known solution to the problems presented by tumbler bars or boxes is to use a liner plate having a pattern of openings cut therethrough. The openings through the liner plate cause material exiting the body to tumble as they pass thereover and also trap fines, both of which reduce wear on the liner plate. An example of such a liner plate is shown in commonly-owned U.S. Pat. No. 5,851,043 granted Dec. 22, 1998. However, the openings in such liner plates are typically formed by cutting openings through the plates, which creates costly scrap wear material. The formation of the openings also requires several cutting operations that adds to the cost of the liner. In addition, such liner plates are formed from a unitary plate of material that has fixed external dimensions. Thus, different liner plates must be constructed depending on the area of the material-carrying body to be lined.

This invention is directed to overcoming one or more of the problems set forth above.

DISCLOSURE OF THE INVENTION

In accordance with one aspect of this invention, a liner for a high wear portion of a load carrying work machine body comprises a first plate section having a first set of lateral projections that define a first set of laterally-opening recesses and a second plate section having a second set of projections that define a second set of laterally-opening recesses. The second set of projections and the second set of recesses confront the first set of projections and the first set of recesses. The first and second plate section are located adjacent one another such that the first set of projections interfit in respective ones of the second set of recesses and the second set of projections interfit in respective ones of the first set of recesses to thereby define a segmented plate structure having top and bottom surfaces. The first and second plates sections are also located such that the first and second sets of projections cooperate to define a plurality of openings extending from the top surface to the bottom surface of the plate structure.

In another aspect of this invention, a method for manufacturing a liner for a high wear area of a load-carrying body comprises providing a unitary plate of wear-resistant material and separating the plate into at least first and second distinct plate sections. The method further comprises assembling the plate sections onto the high wear area of the load-carrying body adjacent one another in a configuration such that portions of the first section interfit with portions of the second section and the sections together define a segmented liner plate structure having top and bottom surfaces, with the first and second plate sections interfitting such that voids between the plate sections create openings extending through the liner plate structure from the top surface thereof to the bottom surface thereof.

Other features and advantages of this invention will become apparent from the following description and the accompanying drawings.

BEST MODE FOR CARRYING OUT THE INVENTION

Figure 1:
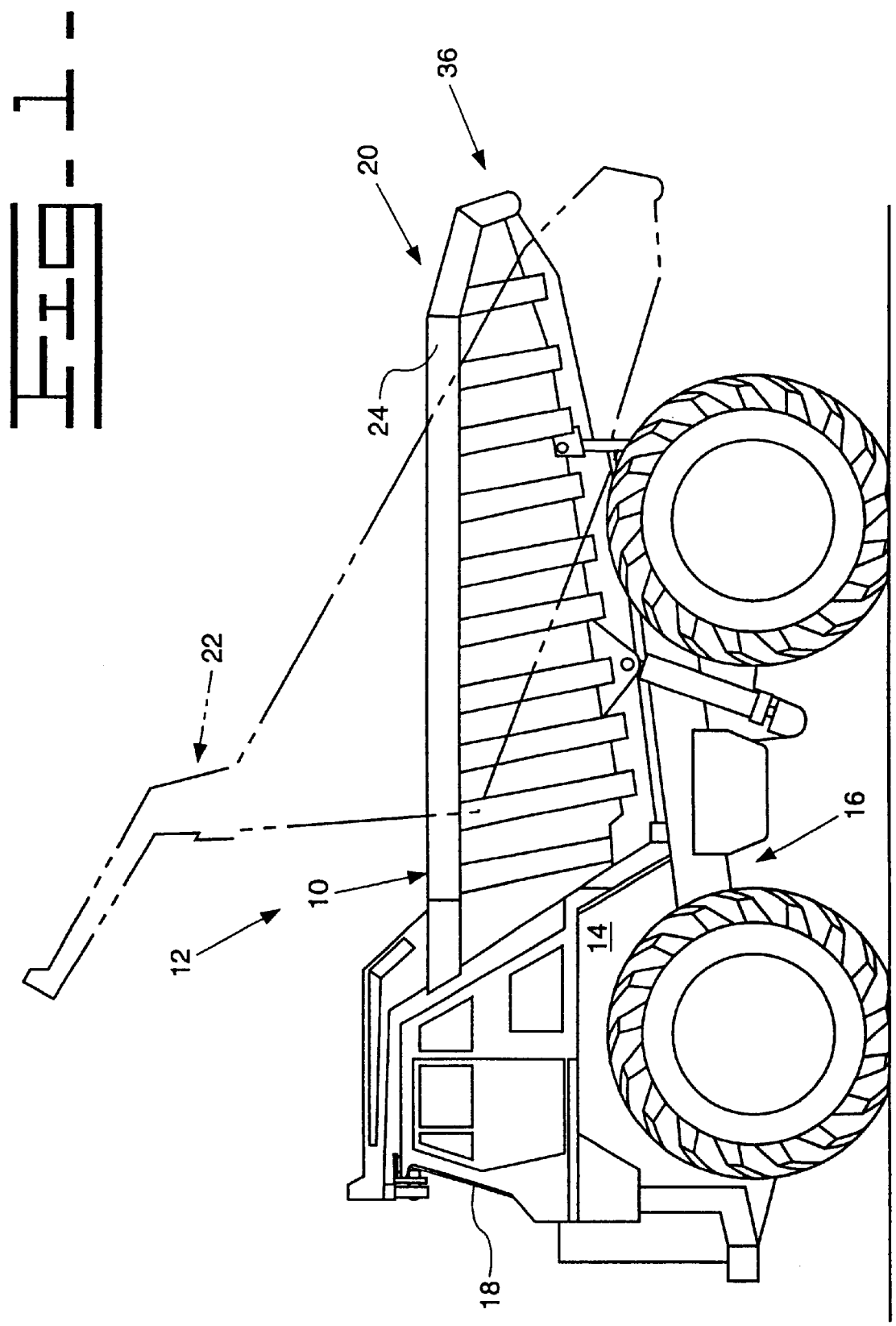
FIG. 1 is a side view of an off-highway truck on which a liner in accordance with this invention may be used.

With reference to FIG. 1, a body 10 for a work machine 12 is shown as, for example, the material carrying body of an off-highway truck 14. The body 10 is constructed and of an appropriate configuration to receive, transport and dump loads for mining, earthmoving, and construction purposes as well known in the art. Typically, the body 10 is carried on a chassis 16 having a cab 18 from which an operator can control the orientation of the body 10 to position it in either a horizontal, or load receiving and carrying, position 20 or a relatively upright position 22 (shown in phantom) from which a load, such as dirt, coal or other material can be dumped.

Figure 2:
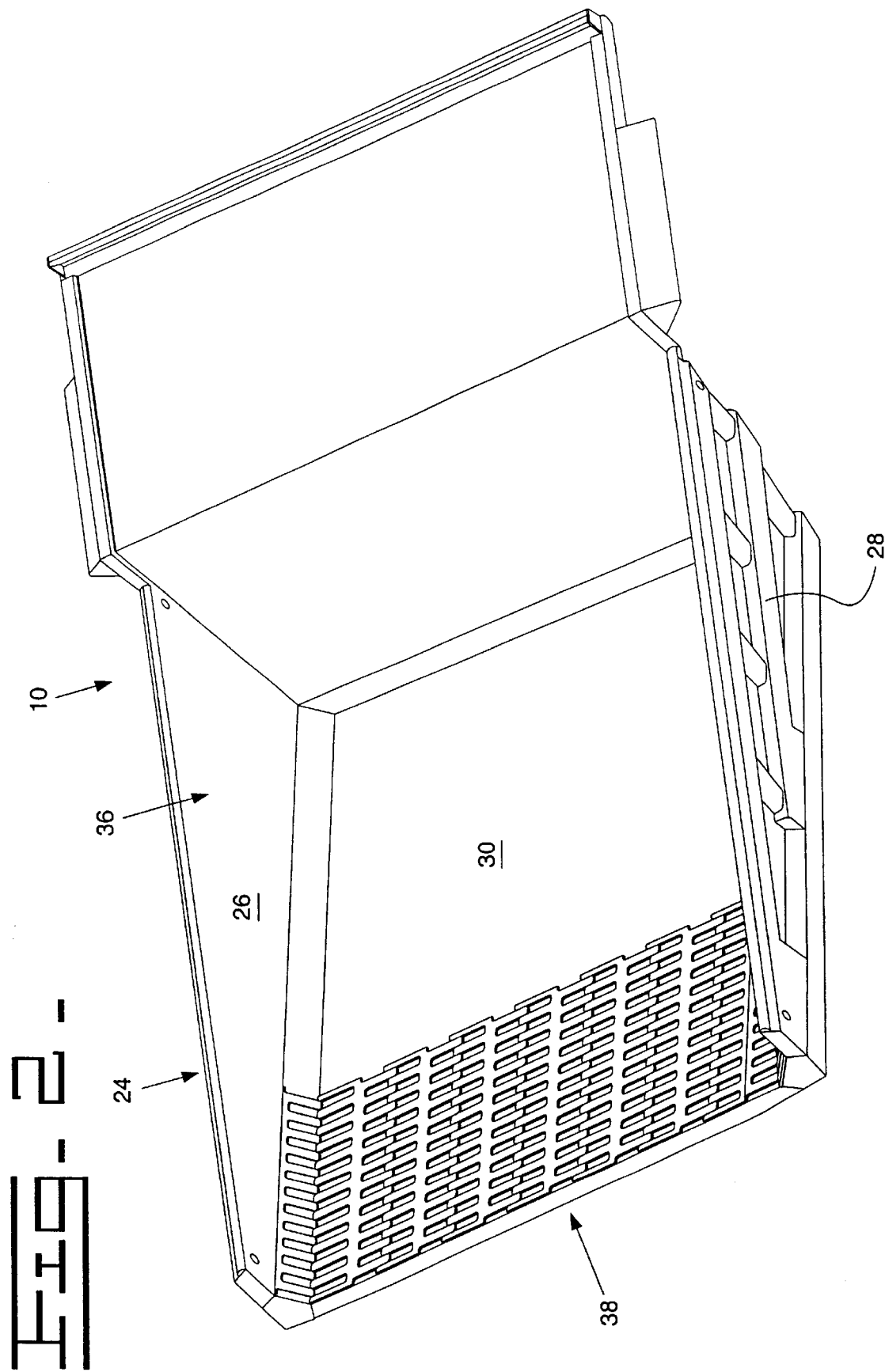
FIG. 2 is a perspective view of a truck body of the off-highway truck illustrated in FIG. 1 showing a liner in accordance with this invention.

Referring also to FIG. 2, the body 10 has a bed 24 which includes first and second sides or side walls 26,28, a bottom 30, and a forward or end wall 32. The first and second sides 26,28 and end wall 32 are each connected to the bottom 30. Each of these elements is of a desired size, which is defined to be dimension and shape, such that a load carrying cavity 34 is formed of desired configuration for the type of load carried. For example, the illustrated cavity 34 has a flat floor configuration, but other commonly-known configurations such as V-bottom floors could be used. The load carrying cavity 34 has a rear opening 36 through which material escapes when the bed 24 is moved from the horizontal 20 to the upright position 22. A rear gate or other device (not shown) at the rear opening 36 is sometimes used in this and other types of trucks to contain the load.

Figure 3:
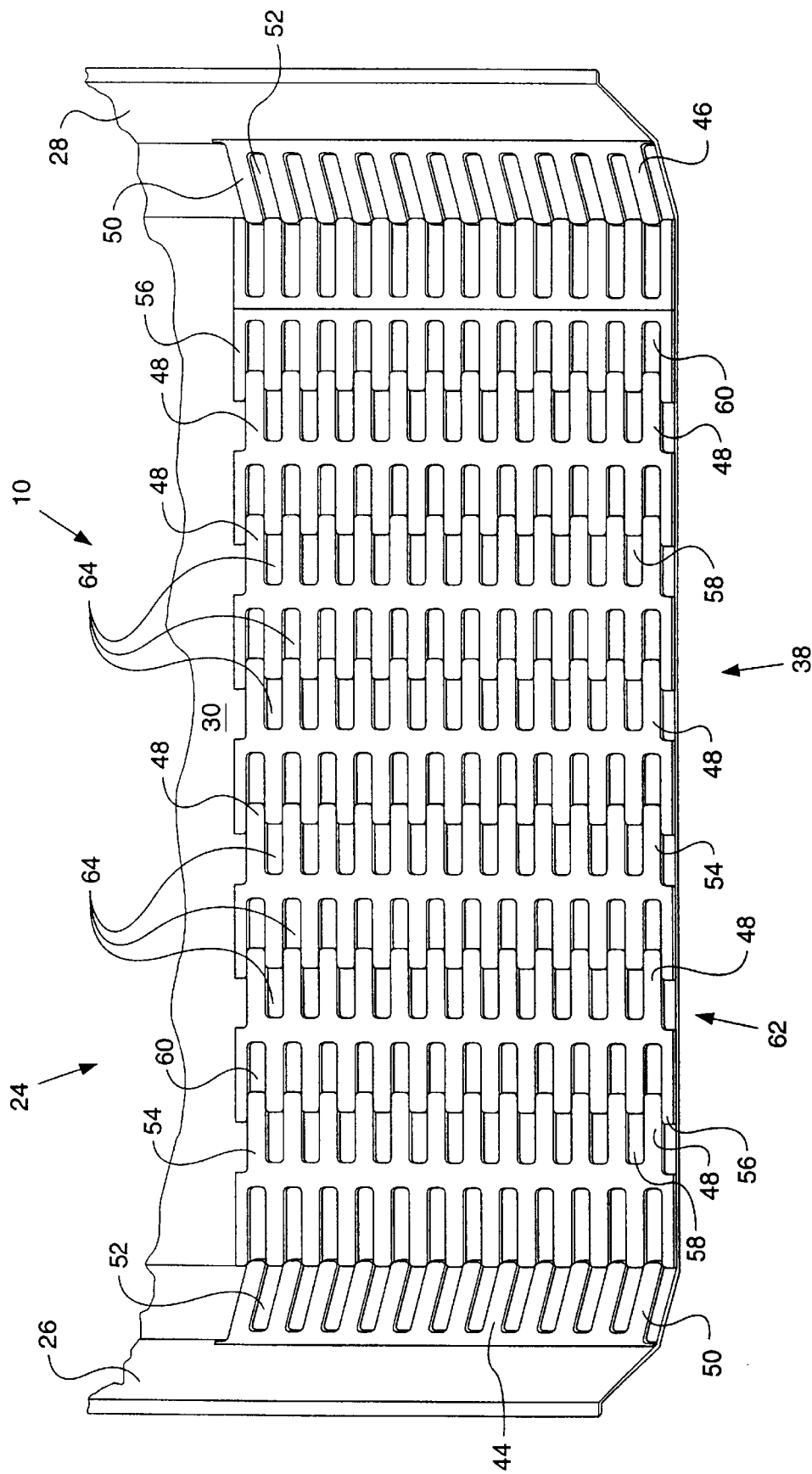
FIG. 3 is a plan view of a portion of the truck body and liner shown in FIG. 2
Figure 4:
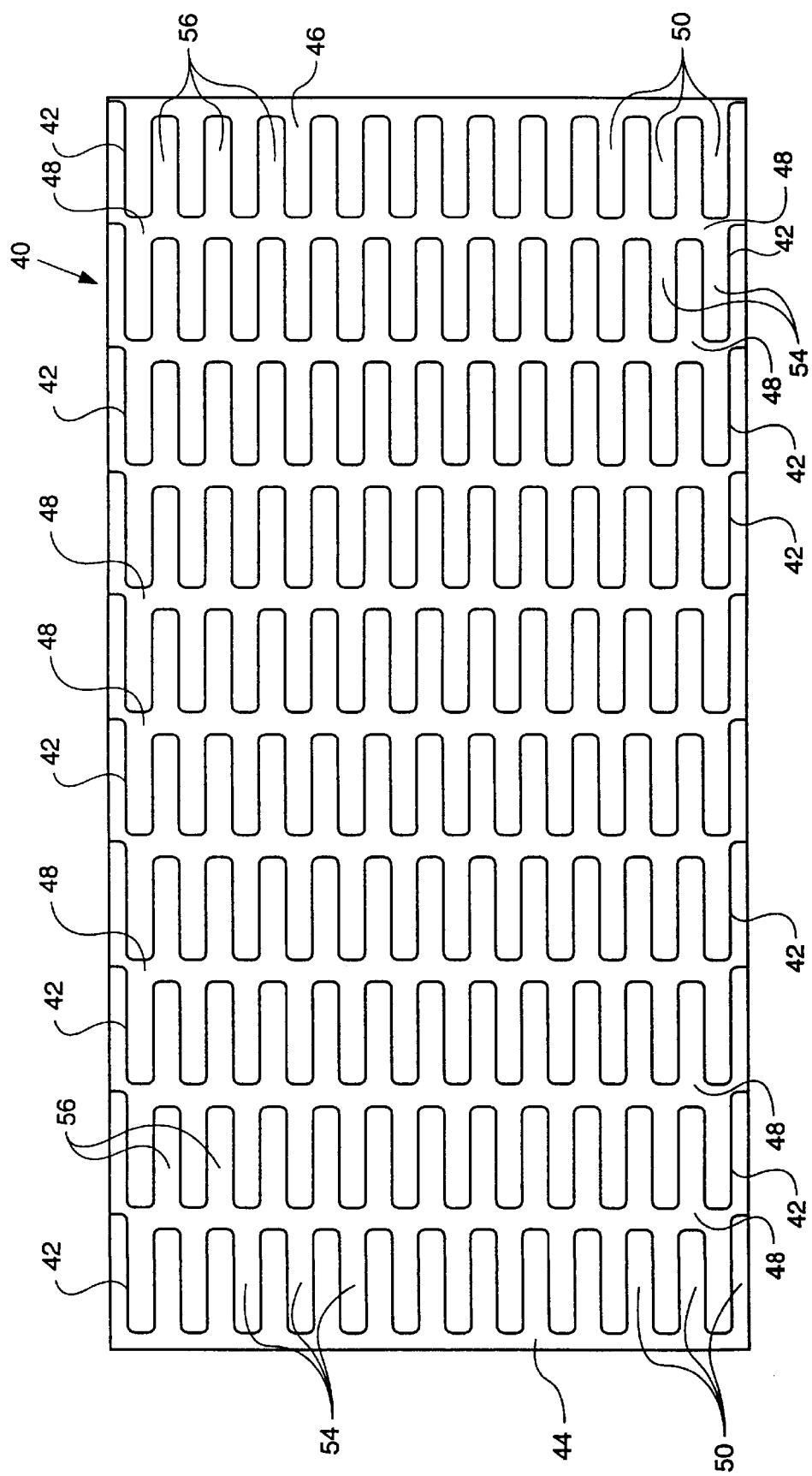
FIG. 4 is a plan view of a plate used to form the liner of FIGS. 2 and 3 prior to fabrication.

With reference to FIGS. 2 through 4, a liner, generally designated 38, is provided for protecting the body 10, particularly in the high wear portions where it is cost effective to provide additional protection. In off-highway trucks, the high wear portions are typically the approximate one-third of the bed 24 adjacent the rear opening 36.

The liner 38 is preferably formed from a unitary plate 40 of high wear material, such as hardened steel. A plate 40 having a thickness of 25 mm and a hardness of at least 400 Brinell is considered suitable for many applications, although a hardness of at least 450 Brinell is preferred. One skilled in the art will recognize that the appropriate plate thickness on hardness depends and the particular application in which the liner 38 will be used.

With reference particularly to FIG. 4, the plate 40 is separated into a plurality of plate sections along the lines 42 shown in FIG. 4. This separation can be performed by any suitable means, such as flame cutting or underwater plasma cutting. In the embodiment illustrated in FIG. 4, the plate 40 is separated into two end section 44 and 46 and one or more substantially identical intermediate section 48. Of course, the intermediate sections 48 need not be substantially identical. Each of the end plate sections 44, 46 is formed with a laterally projecting set of fingers or projections 50 that define a laterally opening set of gaps or recesses 52 between the projections 50. Similarly, each of the intermediate plate sections 48 is provided with two opposing sets of fingers or projections 54, 56 that define respective sets of gaps or recesses 58, 60 between them.

Referring now to FIGS. 2 and 3, the plate sections 44, 46, 48 are assembled onto the high wear portion of the bed 24 to form a segmented liner plate structure, generally designated 62 having a top surface and a bottom surface. As apparent, the bottom surface of the plate structure 62 is supported on the bed 24. In the illustrated embodiment, the end plate sections 44, 46 are located on the bed 24 along its side margins. An intermediate plate section 48 is located adjacent the end plate section 44 such that the projections 50 of the end plate section 44 are received and interfit in confrontingly-aligned recesses 58 of the intermediate plate section 48. Likewise, the projections 52 of the intermediate plate section 48 are received and interfit in confrontingly-aligned recesses 52 in the end plate section 44. The end plate section 44 and the intermediate plate section 48 are spaced laterally apart so that they do not together form an imperforate plate structure. Instead, lateral spacing between the plate sections 44, 48 is provided so that the margins of the projections 50, 54 and their associated recesses 52, 58 define voids or openings 64 through the segmented plate structure 62 from the top surface to the bottom surface thereof.

As apparent from FIGS. 2 and 3, additional intermediate plate sections 48 are located adjacent the aforementioned intermediate plate section 48 and the end plate sections 46, with projections 54, 56 of adjacent intermediate plate sections 48 interfitting in confrontingly-aligned recesses 58, 60 of adjacent intermediate plate sections 48. The end plate section 46 interfits with the last intermediate plate section 48 to complete the liner plate structure 62. As a result, the plate sections 44, 46, 48 interlock as described above to create a preselected pattern or grid of voids or opening 64 in the segmented plate structure 62.

Figure 5:
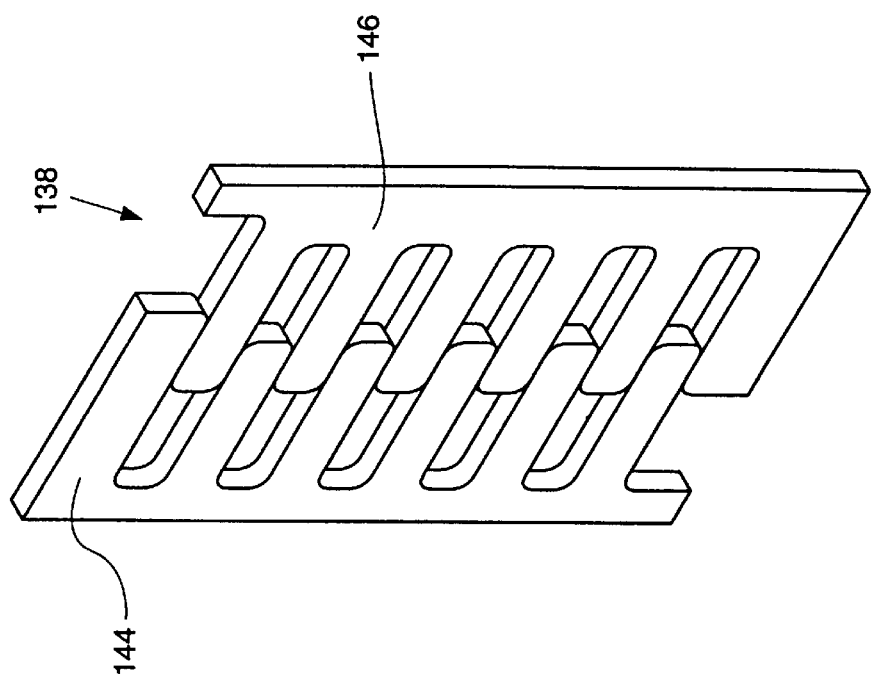
FIG. 5 is a perspective view of a plate used to form a second embodiment of a liner in accordance with this invention.
Figure 6:
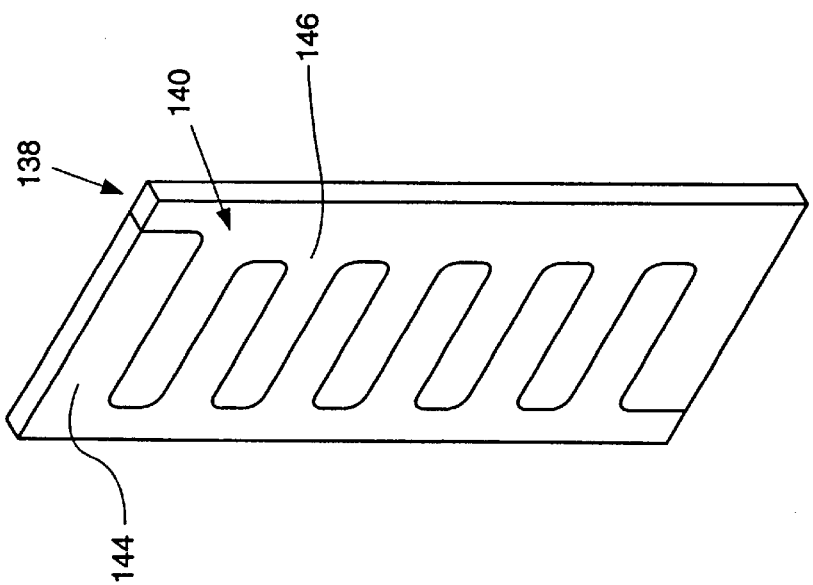
FIG. 6 is a perspective view showing the second embodiment of a liner in accordance with this invention prior formed from the plate illustrated in FIG. 5.

One skilled in the art will recognize that the preferred finger-like configuration of the projections 50, 54, 56 and recesses 52, 58, 60 shown in the drawings, which are created by zig-zag cuts across the plate 40, is not a necessary part of this invention. Other projection and recess configurations may be used without departing from the spirit and scope of this invention. Likewise, fewer or more intermediate plate sections 48 may be used. For example, as shown in FIGS. 5 and 6, a liner, designated 138, can be formed without intermediate plate sections by separating a plate 140 into just two interfitting plate sections 144, 146. In this embodiment, liners for smaller areas can be formed or multiple ones of these two-piece interfitting liners 138 can be provided to cover larger areas.

In all cases, the liners 38, 138 can be attached to the bed 24 in a variety of ways, preferably for removal when worn. Due to the heavy-duty application in off-highway trucks, a preferred approach is to weld the plate sections 44, 46, 48 to the bed 24. Welding resists vibration and is durable, and the plate sections 44, 46, 48 are removable through breaking of the welds for replacement purposes. Of course, other fastening means can be used, such as bolts and other suitable mechanical and/or interlocking attachment mechanisms.

Industrial Applicability

The disclosed liner 38 provides an extremely durable and flexible approach to protecting the truck body 10 from wear. The liner 38 can be prefabricated and replaced when worn, which is particularly convenient in off-highway truck applications where the trucks are too large to transport great distances for repair and downtime of a truck is costly.

The openings 64 formed in the liner 38 cause material escaping from the cavity 34 to tumble instead of sliding. Such tumbling occurs because material, as it moves toward the rear opening 36, tends to catch on the margins of the openings 64. The liner 38 thus reduces wear to the parent body 10 through not just the protection afforded by the thickness of the liner 38 itself, but also because the tumbling action reduces abrasive wear. In addition, while the openings 50 in the liner plates 40 reduce the weight of the liner plates 40, the openings 50 may also trap fine material therein, thereby further insulating the bed 24 from impact and wear.

The interfitting or interlocking construction of the liner 38 in accordance with this invention provides additional benefits. For example, the liner 38 is formed from a unitary plate of wear material without creating scrap material as in prior designs. As a result, cost is greatly reduced compared to comparable liners using prior designs. Fabrication costs are also reduced, since the plate is simply cut into plural interfitting or interlocking plate sections, instead of tediously cutting multiple openings in the plate. In addition, the interfitting or interlocking configuration provides dimensional flexibility, so that liners having a variety of dimensions can be formed from commonly-sized unitary plates. To adjust for various widths, for example, the relative spacing between the adjacent plate sections 44, 46, 48 is varied to create a segmented plate structure having the desired width.

Although the presently preferred embodiments of this invention have been described, it will be understood that within the purview of the invention various changes may be made within the scope of the following claims.

What is claimed is:

1. A liner for a load carrying work machine body, comprising:
   a first wear resistant plate section having a plurality of laterally extending projections defining a plurality of laterally opening recesses therebetween; and
   a second wear resistant plate section having a plurality of laterally extending projections defining a plurality of laterally opening recesses therebetween, said first and second plate sections are located adjacent to one another such that a plurality of openings are defined in said liner.

2. The liner of claim 1 wherein said openings cause load material ejected across said liner to tumble rather than slide across said top surface of said plate structure.

3. The liner of claim 2 wherein at least one of said first wear resistant plate and said second wear resistant plate is manufactured from steel.

4. The liner of claim 2 wherein at least one of said first wear resistant plate and said second wear resistant plate is manufactured from metal.

5. The liner of claim 2 wherein at least one of said first wear resistant plate and said second wear resistant plate is manufactured from a non-metallic material.

6. The liner of claim 2 wherein at least one of said first wear resistant plate and said second wear resistant plate is manufactured from a single homogeneous material.

7. A liner for a load carrying work machine body, comprising:
   a first wear resistant plate section having a first set of lateral projections that define a first set of laterally-opening recesses; and
   a second wear resistant plate section having a second set of projections that define a second set of laterally-opening recesses, said first and second plate section sections are located adjacent to one another such that the first set of projections interfit in respective ones of the second set of recesses to thereby define a segmented plate structure.

8. The liner of claim 7 wherein at least one of said first wear resistant plate and said second wear resistant plate is manufactured from steel.

9. The liner of claim 7 wherein at least one of said first wear resistant plate and said second wear resistant plate is manufactured from metal.

10. The liner of claim 7 wherein at least one of said first wear resistant plate and said second wear resistant plate is manufactured from a non-metallic material.

11. The liner of claim 7 wherein at least one of said first wear resistant plate and said second wear resistant plate is manufactured from a single homogeneous material.

* * * * *